Nov. 6, 1923.
J. F. COOK
1,473,081
FRUIT CATCHER AND GRADER
Filed Feb. 20, 1922
2 Sheets-Sheet 1
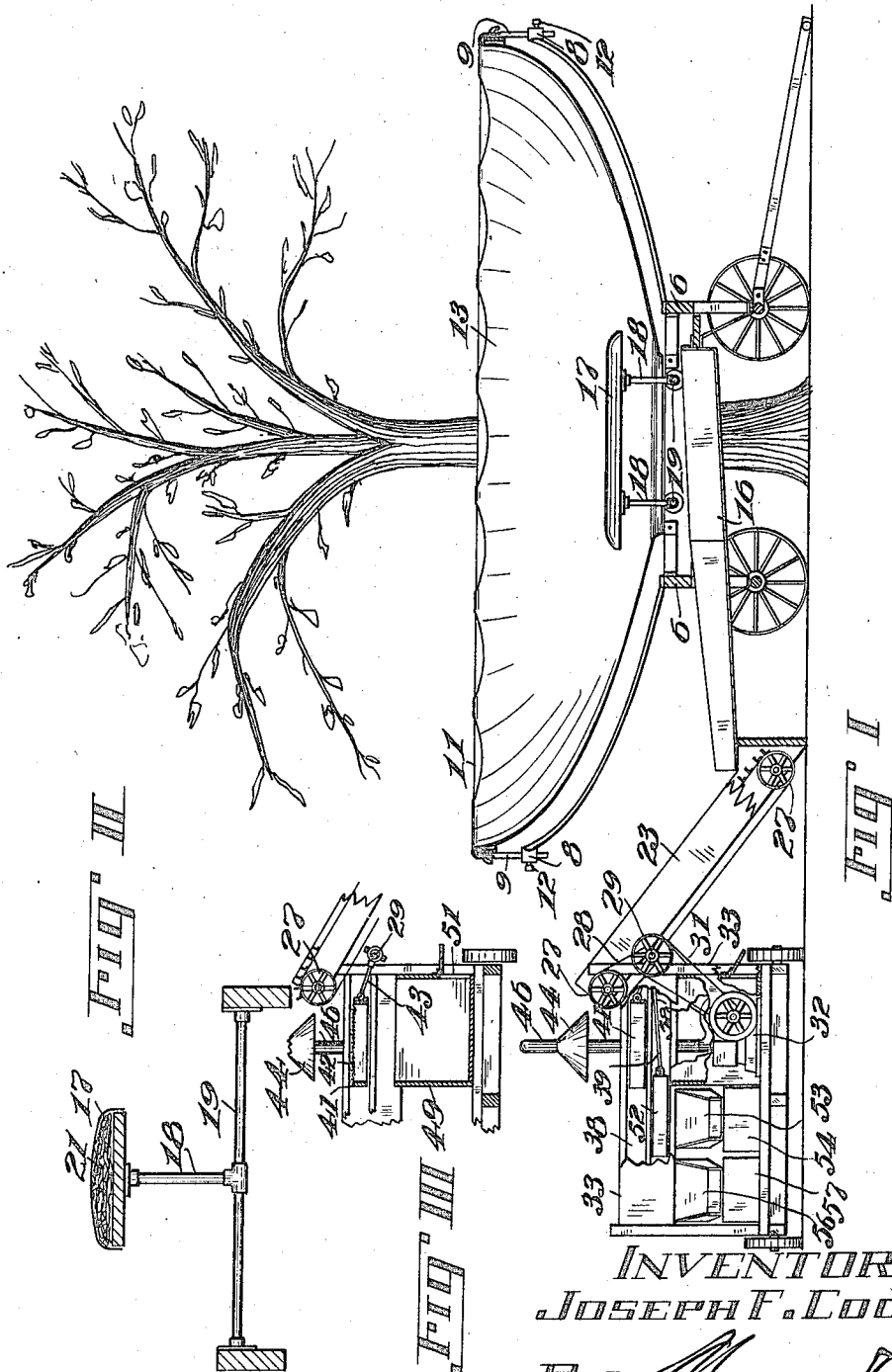
INVENTOR
JOSEPH F. COOK
ATTORNEYS

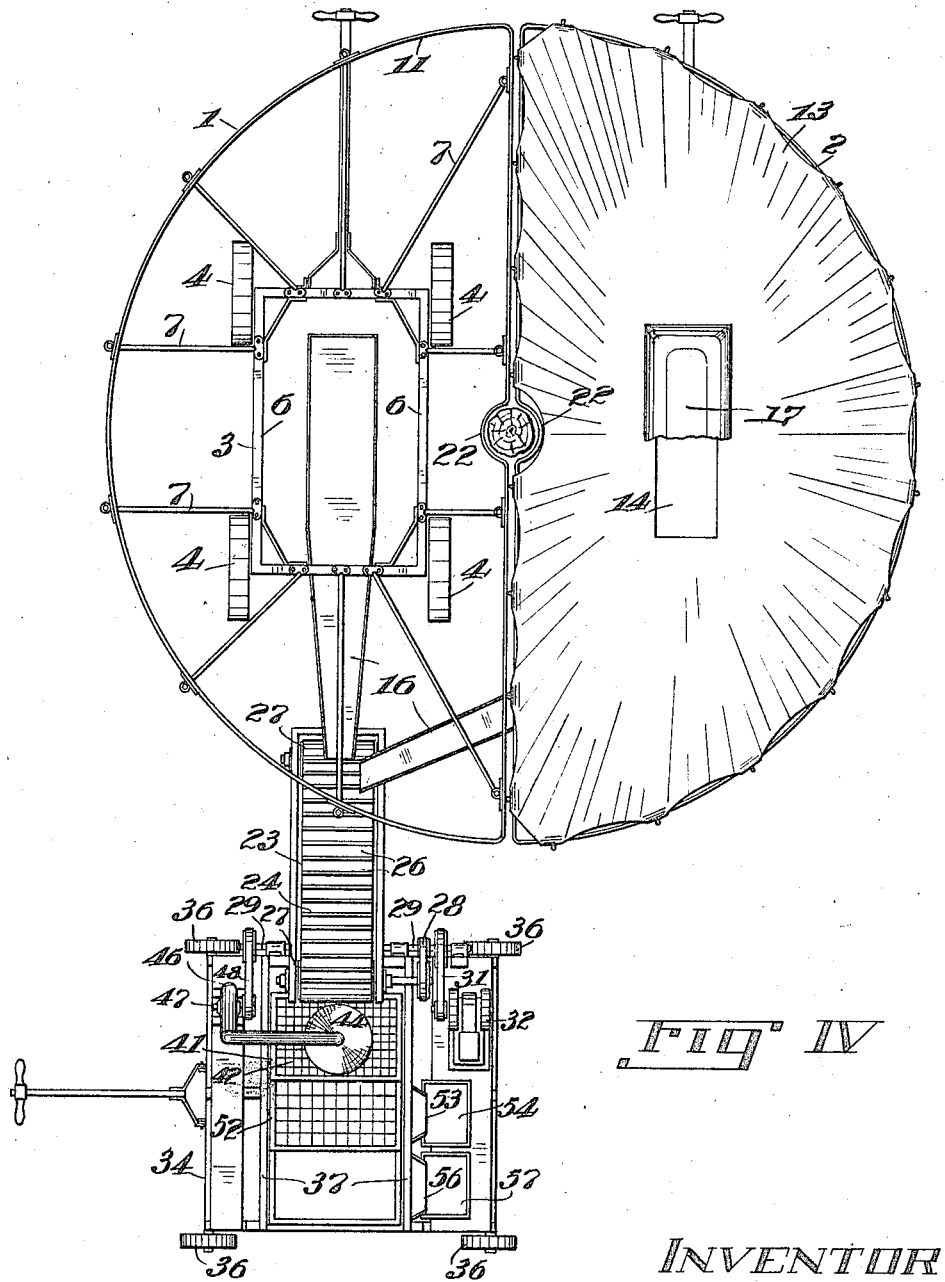

Patented Nov. 6, 1923.

1,473,081

UNITED STATES PATENT OFFICE.

JOSEPH F. COOK, OF SAN FRANCISCO, CALIFORNIA.

FRUIT CATCHER AND GRADER.

Application filed February 20, 1922. Serial No. 537,947.

*To all whom it may concern:*

Be it known that I, JOSEPH F. COOK, a citizen of the United States, and a resident of San Francisco, county of San Francisco, and State of California, have invented a new and useful Fruit Catcher and Grader, of which the following is a specification.

The present invention relates to a combination fruit catcher and grader and has particular reference to the harvesting of fruits such as apples, prunes, apricots, and the like which require careful handling. The principal object of the present device is to facilitate the gathering of such fruits and to thereby make harvesting more economical. A further object of the invention is to make it unnecessary for the fruit pickers to climb the trees whereby the latter is not infrequently damaged, and whereby much time is wasted. A further object of my invention is to make my fruit catcher portable so that it may be easily and quickly removed from one tree to the next one, and to provide a portable grader in combination with the same whereby the fruit gathered may be graded simultaneously. A further object is to provide means for cleaning the fruit gathered from leaves, small branches and other foreign substances during the process.

With these objects in view I have illustrated the preferred form of my invention in the accompanying drawings, in which Figure 1 represents a side view of my device, the fruit catcher being shown in longitudinal section; Figure 2 a detail view of a bumper used in connection with the same; Figure 3 a sectional detail view of a portion of my grader, and Figure 4 a top plan view of the whole device.

My fruit catcher consists of two substantially independent parts (1) and (2), each of which is mounted on a truck (3) supported on a plurality of wheels (4). From the frame (6) of the truck extend in substantially radial direction a plurality of rods or arms (7) carrying at their extreme ends vertical sleeves (8) adapted to receive vertical studs (9) depending from a substantially semi-circular ring (11). The ring is vertically adjustable and may be held in a certain position by means of set-screws (12). It supports a canvas (13) which sags toward the center and is provided with a central perforation (14) registering with a chute (16) disposed underneath the truck frame. To prevent fruit falling from a tree from striking the bottom of the chute too violently, I provide a bumper (17) covering the perforation (14) and supported on the uprights (18) resting on transverse members (19). It will be seen that fruit falling from the tree directly over the perforation (14) would first hit the bumper (17), which is stuffed as shown at (21), and would roll off the same on the canvas and gradually find its way into the chute.

The whole fruit catcher, as previously stated, consists of two practically independent parts both of which are substantially semi-circular in form and provided with semi-circular recesses (22) so that the two may be placed around a tree in the manner shown in Figure 4 without leaving any space uncovered through which fruit might fall directly on the ground. The two chutes (16) lead to a conveyor (23) including an endless belt (26) having a plurality of cross members (24) thereon and passed over two drums (27) the upper one of which is actuated by means of a belt (28) from a shaft (29). The latter shaft receives rotary motion through a belt (31) from a motor (32).

The upper end of the conveyor rests on the front end of the grader (33) which comprises a truck (34) resting on the wheels (36) supporting a central frame (37) which latter is divided into a plurality of compartments and is provided near its top with two parallel guide-ways (38) and (39). In the upper one a box (41) with a screened top (42) is adapted to be reciprocated by means of a connecting rod (43), the far end of which is pivotally connected to a crank in the shaft (29). Over this box (41) is mounted a blower (44) connecting with a pipe (46) leading to an air pump (47) driven by means of the belt (48) from the shaft (29). Underneath the box (41) which reciprocates over the first compartment is disposed a box (49) adapted to receive the leaves and small branches that may be blown through the perforations of the box (41) by the blower (44). An outlet (51) is provided in the box through which its contents may be removed.

The fruit after passing over the first box (41) drops on the second box (52) having a perforated top, the perforations being of larger dimensions than those of the box (41). The smaller specimens will fall through these perforations and will be guided through a hopper (53) into the fruit box (54), while the larger specimens will pass over the box and be guided through the hopper (56) into the fruit box (57).

The operation of the device will be readily understood from the foregoing description. The two parts forming the fruit catcher are handled individually on their trucks and are placed around the tree in the manner shown in Figure 4. The branches of the tree are then shaken by means of sticks or otherwise so that the fruit drops on the canvas and rolls along the same into the chutes (16), the bumper (17) protecting the fruit from striking the bottom of the chute violently. The two chutes lead the fruit to the bottom of the conveyor (23) which lifts the same and delivers it to the box (41). The latter is shaken back and forth continuously through the connecting rod (43) so that it moves the fruit forward while the blower simultaneously blows light pieces of foreign matter, such as leaves and small branches, into the box (43). The fruit itself passes over the box (41) and drops on the box (52), which latter is also continuously shaken back and forth by means of the connecting rod (58) receiving its motion from a crank in the shaft (29). The smaller specimens of the fruit fall through the perforations in the box (52) and are guided into the fruit box (54) while the larger specimens pass through the box and finally land in the fruit box (57).

I claim:

In a fruit gatherer, a fruit catching element comprising a truck, a plurality of arms extending therefrom in substantially radial direction, each having a vertical sleeve associated with its end, a ring having downwardly extending studs for adjustably engaging the sleeves and a canvas supported on the ring.

JOSEPH F. COOK.